United States Patent Office 2,851,507
Patented Sept. 9, 1958

2,851,507
NATURAL RUBBER VULCANIZING COMPOSITION CONTAINING ACYL HYDRAZINES AS SCORCH RETARDERS AND METHOD OF VULCANIZING SAME

Willard M. St. John, Jr., Borger, and Carl A. Uraneck, Phillips, Tex., assignors to Phillips Petroleum Company, a corporation of Delaware No Drawing. Application July 14, 1953
Serial No. 367,975

14 Claims. (Cl. 260—780)

This invention relates to the use of acyl substituted hydrazines as scorch retarders in the vulcanization of rubber compounds. It relates also to the new vulcanized rubber compounds which result from the use of these specific derivatives; also to novel vulcanizable rubber compositions.

Vulcanization accelerators are employed in the manufacture of rubber products to speed up the curing or vulcanization of the rubber product. When natural rubber is vulcanized in the presence of conventional accelerators and particularly with furnace carbon blacks of relatively high pH value, the composition frequently has a tendency to prevulcanize. This precuring or prevulcanization is known in the art as "scorching," and it is essential that this premature curing be prevented in order to permit proper factory processing, such as preforming or shaping the desired article prior to the actual vulcanization. When natural rubber is compounded in a conventional recipe using conventional accelerators and a relatively low pH carbon black, such as a channel black, this carbon black retards the curing action, and scorching is not a particularly serious problem. However, with carbon blacks having a pH above about 8 it is usually necessary to employ a scorch retarder in the compounding mixture.

According to our invention, there is provided a method of preventing scorch in the compounding of rubbers which have a tendency to prevulcanize during compounding operations, especially natural rubbers, by incorporating into the recipe or mix a compound now to be described.

The scorch retarders of our invention are acyl substituted hydrazines of the following formulas:

A.
$$\underset{\text{R}}{\overset{\text{O}}{\|}}\text{C}-\underset{\text{R}'}{\overset{|}{\text{N}}}-\underset{\text{R}'}{\overset{|}{\text{N}}}-\text{X}$$

wherein R is selected from the group consisting of alkyl, cycloalkyl, and aromatic radicals, and any combination of these radicals, and contains from 7 to 19 carbon atoms, and R' is selected from the group consisting of hydrogen, alkyl, cycloalkyl, and aryl radicals, the recited groups other than hydrogen containing from 4 to 20 carbon atoms; X is selected from the group consisting of R' and $$\text{R}-\overset{\text{O}}{\overset{\|}{\text{C}}}-$$

in which R and R' are as defined herein, and at least one R' is hydrogen; and

B.
$$\text{X}-\underset{\text{R}'}{\overset{|}{\text{N}}}-\underset{\text{R}'}{\overset{|}{\text{N}}}-\overset{\text{O}}{\overset{\|}{\text{C}}}-\text{R}''-\overset{\text{O}}{\overset{\|}{\text{C}}}-\underset{\text{R}'}{\overset{|}{\text{N}}}-\underset{\text{R}'}{\overset{|}{\text{N}}}-\text{X}$$

wherein R' and X are as defined herein, and R'' is selected from the group consisting of an alkylene, cycloalkylene, and arylene radicals, and any combination of these radicals, and contains from 6 to 18 carbon atoms. The total number of carbon atoms in the molecule will preferably be 30 or less, but may be as high as 35 or 40 in some instances. These groups can also contain oxygen in the form of ether linkages, and can contain substituents such as hydroxy groups and the like, provided they do not have any adverse effect on the scorch retarding properties of the molecule. All of the compounds falling within the foregoing description are operative according to the invention.

These acyl derivatives of hydrazine can be prepared by the action of hydrazine on acid chlorides, esters, or anhydrides; by heating an amide with hydrazine; or by other methods known in the art. The hydrazines of type A are prepared from monobasic organic acids and those of type B are prepared from dibasic organic acids.

The monoacyl derivatives of type A are named as the hydrazides of the corresponding acid. Included in the monoacyl substituted hydrazines of our invention are caprylic acid hydrazide, lauric acid hydrazide, pentadecoic acid hydrazide, palmitic acid hydrazide, stearic acid hydrazide, nondecoic acid hydrazide, arachidic acid hydrazide, benzoic acid hydrazide, and γ-phenylcaprylic acid hydrazide, p-tertiary-butylbenzoic acid hydrazide, p-methoxybenzoic acid hydrazide, 8-hydroxylauric acid hydrazide, and the like. Thus the formula for a monoacylated hydrazine is $$\text{C}_7\text{H}_{15}-\overset{\text{O}}{\overset{\|}{\text{C}}}-\overset{\text{H}}{\overset{|}{\text{N}}}-\text{NH}_2$$

(n-octanoylhydrazide)

The diacyl derivatives of type A are named as substituted hydrazines, and we include as examples of our scorch retarders the following: dicaprylylhydrazine, dicaprylhydrazine, dilauroylhydrazine, dipalmitylhydrazine, distearylhydrazine, diarachidylhydrazine, dibenzoylhydrazine, di[β(p-ethylphenyl)propionyl] hydrazine and the like. Thus, the formula for a diacylatedhydrazine is:

$$\text{C}_7\text{H}_{15}-\overset{\text{O}}{\overset{\|}{\text{C}}}-\overset{\text{H}}{\overset{|}{\text{N}}}-\overset{\text{H}}{\overset{|}{\text{N}}}-\overset{\text{O}}{\overset{\|}{\text{C}}}-\text{C}_7\text{H}_{15}$$

(1,2-di(n-octanoyl)hydrazine)

The derivatives of the dicarboxylic acids, illustrated by formula B, are named as the dihydrazides of the corresponding acid. Examples of these compounds which function as scorch retarders are malonic acid dihydrazide, succinic acid dihydrazide, glutaric acid dihydrazide, β-ethoxyadipic acid dihydrazide, pimelic acid dihydrazide, γ-hydroxysuberic acid dihydrazide, azelaic acid dihydrazide, sebacic acid dihydrazide, brassilic acid dihydrazide, thapsic acid dihydrazide, phthalic acid dihydrazide, dimethylphthalic acid dihydrazide and the like. Thus, formulas for compounds of the type set forth in this paragraph are:

$$\text{H}_2\text{N}-\overset{\text{H}}{\overset{|}{\text{N}}}-\overset{\text{O}}{\overset{\|}{\text{C}}}-\underset{}{\bigcirc}-\overset{\text{O}}{\overset{\|}{\text{C}}}-\overset{\text{H}}{\overset{|}{\text{N}}}-\text{NH}_2$$

(terephthalic acid dihydrazide)

$$\text{C}_7\text{H}_{15}-\overset{\text{O}}{\overset{\|}{\text{C}}}-\overset{\text{H}}{\overset{|}{\text{N}}}-\overset{\text{H}}{\overset{|}{\text{N}}}-\overset{\text{O}}{\overset{\|}{\text{C}}}-\underset{}{\bigcirc}-\overset{\text{O}}{\overset{\|}{\text{C}}}-\overset{\text{H}}{\overset{|}{\text{N}}}-\text{NH}_2$$

(2-n-octanoyl)terephthalic acid dihydrazide $$\text{C}_7\text{H}_{15}-\overset{\text{O}}{\overset{\|}{\text{C}}}-\overset{\text{H}}{\overset{|}{\text{N}}}-\overset{\text{H}}{\overset{|}{\text{N}}}-\overset{\text{O}}{\overset{\|}{\text{C}}}-\underset{}{\bigcirc}-\overset{\text{O}}{\overset{\|}{\text{C}}}-\overset{\text{H}}{\overset{|}{\text{N}}}-\overset{\text{H}}{\overset{|}{\text{N}}}-\overset{\text{O}}{\overset{\|}{\text{C}}}-\text{C}_7\text{H}_{15}$$

(2,2'-dioctanoyl)terephthalic acid dihydrazide

The monosubstituted derivatives such as suberic acid monohydrazide, sebacic acid monohydrazide, etc., are also useful in our invention.

The quantity of the novel scorch retarder employed will depend to some extent on the molecular weight of the specific compound, and in general the higher the molecular weight the greater is the quantity required to provide a given retardation. We have found that from 0.5 to 5 parts per hundred of rubber can be used and usually we prefer to employ from 1.0 to 3 parts per hundred of rubber. If desired, in excess of about 5 parts per hundred of rubber of the novel scorch retarders can be employed.

Our materials are effective in compounding recipes employing vulcanization accelerators. Examples of accelerators with which our materials are effective are the known accelerators, such as xanthates, dithiocarbamates, mercaptobenzothiazole, benzothiazole disulfide, N-cyclohexyl-2-benzothiazole sulfenamide, and the like.

The scorching property of a particular rubber mix can be determined by various test methods which are described in the literature. We have employed one of the common methods, known as the Mooney scorch determination to obtain the results which are shown in the following example. In this method the samples are placed in a Mooney shearing disc viscometer and the resistance of the rubber to a shearing action at a given temperature is determined. This method is described in U. S. Patent 2,582,829 (1952) to Harbison, as well as in technical articles.

One of the specific advantages of using our scorch retarders is that they do not provide any secondary effects such as a marked decrease in the ultimate degree of cure of the compounded rubber. Further, these retarders do not provide any harmful effects on the physical properties of the vulcanized rubber such as tensile strength, abrasion resistance and the like.

While our scorch retarders are most useful in compounding natural rubber with a high pH furnace black, they also have a certain utility and provide a measure of retardation of scorching in compounding synthetic rubber. They will also be found to have some utility in recipes in which low pH carbon blacks, such as channel blacks, are employed.

EXAMPLE

Three rubber mixes were prepared according to the following compounding recipe. One of these contained no scorch retarder and served as a control while the other two contained dibenzoylhydrazine and dilaurylhydrazine respectively.

Table I

|  | Parts by Weight | | |
|---|---|---|---|
| #1 Smoked Sheet | 100 | 100 | 100 |
| Philblack O [1] | 50 | 50 | 50 |
| Zinc Oxide | 4 | 4 | 4 |
| Stearic Acid | 3 | 3 | 3 |
| Paraflux [2] | 3 | 3 | 3 |
| Flexamine [3] | 1 | 1 | 1 |
| Santocure [4] | 0.4 | 0.4 | 0.4 |
| Sulfur | 2.0 | 2.0 | 2.0 |
| Dibenzoylhydrazine | | 1.0 | |
| Dilauroylhydrazine | | | 1.0 |

[1] High pH furnace carbon black.
[2] An asphaltic flux.
[3] Physical mixture containing 65 wt. percent of a complex diarylaminoketone reaction product and 35 wt. percent N,N'-diphenyl-p-phenylenediamine.
[4] N-cyclohexyl-2-benzothiazole sulfenamide.

The Mooney scorch time at 250° F. and other physical properties of the above samples were determined and are recorded in the following table:

The use of the hydrazine derivatives increased the scorch time at 250° F. by 3 and 4 minutes respectively as indicated in the preceding table. This is an increase of 20 to 25 percent over the scorch time of the control, which contained no scorch retarder, thus, demonstrating the effectiveness of the classes of retarders according to our invention.

Reasonable variation and modification are possible within the scope of the foregoing disclosure and the appended claims to the invention, the essence of which is that a method for increasing scorch time, i. e., reducing or avoiding precuring during the compounding of rubbers, especially natural rubber, has been provided together with rubber compositions, containing a scorch retarder according to the invention, which compositions exhibit increased scorch times, said scorch retarder being an acyl substituted hydrazine, preferably an acyl substituted hydrazine as set forth and described herein.

We claim:

1. A method of increasing the scorch time of a natural rubber composition comprising a vulcanization accelerator which comprises incorporating into said composition an effective amount of an acyl substituted hydrazine.

2. A method according to claim 1 wherein 0.5 to 5 parts per hundred of rubber of the said acyl substituted hydrazine is incorporated into said composition.

3. A method for increasing the scorch time of a natural rubber composition comprising a vulcanization accelerator which comprises incorporating into said composition an effective amount of a scorch retarder selected from the group consisting of compounds having the following formula:

A. 

wherein R is selected from the group consisting of alkyl, cycloalkyl, and aromatic radicals, and any combination of these radicals, and contains from 7 to 19 carbon atoms, and R' is selected from the group consisting of hydrogen, alkyl, cycloalkyl, and aryl radicals, the recited groups other than hydrogen containing from 4 to 20 carbon atoms; X is selected from the group consisting of R' and

in which R and R' are as defined herein, and at least one R' is hydrogen; and

B. 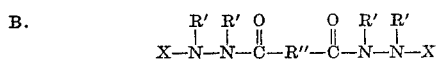

wherein R' and X are as defined herein, and R" is selected from the group consisting of an alkylene, cycloalkylene, and arylene radicals, and radicals composed of any combination of these radicals, and contains from 6 to 18 carbon atoms.

4. A method for increasing the scorch time of a natural rubber composition containing a vulcanization accelerator which comprises incorporating into said composition an effective amount of a monoacyl hydrazine.

5. A method for increasing the scorch time of a natural rubber composition containing a vulcanization accelerator which comprises incorporating into said composition an effective amount of a diacyl hydrazine.

Table II

[30 minutes' cure time at 307° F.]

| Scorch Retarder | 80° F. | | | Oven Aged 24 Hrs. @ 212° F. | | | | Scorch at 250° F. | |
|---|---|---|---|---|---|---|---|---|---|
|  | 300% Modulus | Tensile | Elongation | 300% Modulus | Tensile | Elongation | Compression Set | Minimum Mooney | Minutes to Scorch |
| None | 1,690 | 3,250 | 490 | 1,740 | 2,125 | 340 | 19.0 | 44.5 | 15 |
| Dibenzoylhydrazine | 1,640 | 3,040 | 460 | 1,685 | 2,125 | 350 | 18.9 | 38.5 | 18 |
| Dilauroylhydrazine | 1,750 | 3,320 | 500 | 1,700 | 2,035 | 350 | 17.0 | 36.5 | 19 |

6. A method for increasing the scorch time of a natural rubber composition containing a vulcanization accelerator which comprises incorporating into said composition an effective amount of a hydrazide of a dibasic acid.

7. A method for increasing the scorch time of a natural rubber composition containing a vulcanization accelerator which comprises incorporating into said composition an effective amount of dibenzoylhydrazine.

8. A method for increasing the scorch time of a natural rubber composition containing a vulcanization accelerator which comprises incorporating into said composition an effective amount of dilauroylhydrazine.

9. A rubber composition having improved scorch time characteristics, said composition containing essentially a natural rubber, a vulcanization accelerator, and an effective amount of an acyl substituted hydrazine.

10. A rubber composition having improved scorch time characteristics, said composition containing essentially a natural rubber, a vulcanization accelerator, and an effective amount of an acyl substituted hydrazine, selected from the group consisting of compounds having a formula selected from the following:

A.
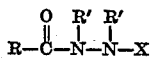

wherein R is selected from the group consisting of alkyl, cycloalkyl, and aromatic radicals, and any combination of these radicals, and contains from 7 to 19 carbon atoms, and R' is selected from the group consisting of hydrogen, alkyl, cycloalkyl, and aryl radicals, the recited groups other than hydrogen containing from 4 to 20 carbon atoms; X is selected from the group consisting of R' and

in which R and R' are as defined herein, and at least one R' is hydrogen; and

B.
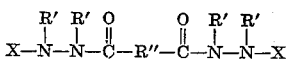

wherein R' and X are as defined herein, and R" is selected from the group consisting of an alkylene, cycloalkylene, and arylene radicals, and radicals composed of any combination of these radicals, and contains from 6 to 18 carbon atoms.

11. A rubber composition having improved scorch characteristics comprising essentially natural rubber, a vulcanization accelerator, and an effective amount of dibenzoylhydrazine.

12. A rubber composition having improved scorch characteristics comprising essentially natural rubber, a vulcanization accelerator, and an effective amount of dilauroylhydrazine.

13. A rubber composition having improved scorch characteristics comprising essentially natural rubber, N-cyclohexyl-2-benzothiazole sulfenamide, and an effective amount of dibenzoylhydrazine.

14. A rubber composition having improved scorch characteristics comprising essentially natural rubber, N-cyclohexyl-2-benzothiazole sulfenamide, and an effective amount of dilauroylhydrazine.

References Cited in the file of this patent
UNITED STATES PATENTS
2,018,643 Williams _____ Oct. 22, 1935

OTHER REFERENCES
Peachey: Society of Chemical Industry Journal; volume 36, 1917, page 427.